United States Patent [19]

Weiler et al.

[11] 4,013,755
[45] Mar. 22, 1977

[54] FILTRATION OF SOLID-CONTAINING TITANYL SULFATE SOLUTIONS

[75] Inventors: Raoul Weiler, Berchem; Joël Leuridan, Antwerp; Jozef Renier, Kapellen, all of Belgium

[73] Assignee: Bayer Antwerpen N.V., Antwerpen, Belgium

[22] Filed: Nov. 5, 1975

[21] Appl. No.: 628,877

[30] Foreign Application Priority Data

Nov. 15, 1974 Germany ............................ 2454220

[52] U.S. Cl. .................................. 423/82; 423/544; 423/615
[51] Int. Cl.$^2$ .................. C01G 23/00; C01G 23/04
[58] Field of Search ........ 423/82, 512, 544, 659 R, 423/615

[56] References Cited

UNITED STATES PATENTS 2,287,861  6/1942  Bousquet et al. .................... 423/82

FOREIGN PATENTS OR APPLICATIONS 1,272,908  7/1968  Germany
1,767,232  3/1972  Germany

OTHER PUBLICATIONS

Book "Titanium" by Jelks Barksdale, 2nd Ed., 1966, pp. 214–215, The Ronald Press Co., New York.
Book "Industrial Filtration of Liquids", 2nd Ed., 1971, by D. B. Purchas, pp. 223, 225 and 227, Leonard Hill Books, London.

Primary Examiner—Edward Stern
Attorney, Agent, or Firm—Burgess, Dinklage & Sprung

[57] ABSTRACT

In the production of a solid-free solution of titanyl sulfate by digesting ilmenite or titanium slag with sulfuric acid, and filtering the resulting solid-containing solution of titanyl sulfate to separate the solids, the improvement which comprises filtering the solution under a pressure of about 1 to 16 bars to form a filter cake of a thickness of about 10 to 35 mm. The filter cake is washed with about 0.1 to 0.5 $m^3$ of water per $m^3$ of filtrate, the wash water is passed through the filter cake at a flow rate of about 0.1 to 1.2 m/h under a pressure of about 1 to 16 bars, and the filter cake is then squeezed to a solid content of about 50 to 70% by weight.

2 Claims, No Drawings

FILTRATION OF SOLID-CONTAINING TITANYL SULFATE SOLUTIONS

It is known that ilmenite ores or titanium slag can be digested with sulfuric acid, optionally followed by the addition of water. Since a "digestion solution" of this kind, which normally contains non-digested particles as a solid phase, is black in appearance, it is also known by the name of "black solution". Non-digested solid particles in the black solution first have to be removed from the titanium-containing solution by a separation process. The solid content of the black solution varies between 20g/l and 75g/l, depending upon the starting material.

After the solid particles have been discarded the titanyl sulfate present in the black solution may be hydrolyzed in known manner to form titanium dioxide hydrate which is calcined and ground following separation of the mother liquor (so-called diluted acid).

It is difficult to obtain a substantially solid-free black solution because of the fine, in many cases even colloidal, dispersion of the solids.

German patent specification No. 513,291 describes a process for the purification of titanium sulfate solutions in sulfuric acid in the presence of trivalent titanium, in which the solutions are cooled and filtered through nitrofilter cloths at extremely low temperatures. However, this process has never been worked on a practical scale, inter alia because of the need to maintain the special, unfavorable temperature range. Instead the digestion solution is normally treated in a multistage process of the type described, for example, in Auslegeschrift No. 1,272,908; Offenlegengsschrift No. 1,767,232; and Titanium by Jelks Barksdale, 2nd Edition 1966, page 214–215.

In this known apparatus the solid-containing black solution is initially introduced into one or more so-called thickener vessels which are large vessels equipped with an overflow in which most of the solid particles are intended to settle. In order to increase the efficiency of these thickeners, flocculation aids, such as ionic polymers, for example polyacrylates, are normally added. In general, the overflow from this settling vessel still has a solid content of about 0.50 to 2.00 g/l which is too high for hydrolysis of the black solution into titanium dioxide hydrate. Accordingly, the overflow is subsequently filtered, normally in a filter press, the solid content of the black solution being reduced to about 15 to 50 mg/l.

The underflow from the thickeners is filtered by means of a vacuum rotary filter, the resulting filtrate subsequently being filtered a second time together with the overflow from the thickeners. Before filtration, the vacuum rotary filter is provided with a so-called "precoat", which is a coating with filter aids such as, for example, diatomaceous earths or finely divided aluminosilicates, in layer thicknesses of about 10 mm to 80 mm. These coatings are intended to filter the substantially non-filterable underflow which has a very high solid content amounting 500 to 1000 g/l.

The filter press, in which the overflow and the filtered overflow from the thickeners are filtered, is also precoated with filter aids. Disadvantages of the conventional process are, in particular, the fact that the multistage separation of the non-digested solids in the black solution is extremely time-consuming, the fact that considerable quantities of flocculation aids have to be used and the fact that thorough washing is not possible with the filtration process, so that $TiOSO_4$ is left behind in the filter cake.

The present invention relates to a process for the separation of solid particles from solutions containing titanyl sulfate obtained by the digestion of ilmenite or titanium slag with sulfuric acid, by filtering the digestion solution in the presence of filter aids, distinguished by the fact that the solid-containing digestion solution is filtered under pressures of about 1 to 16 bars and converted into a filter cake with layer thicknesses of about 10 mm to 35 mm, the filter cake is optionally treated on the filter itself with a wash liquid, e.g. water, diluted sulfuric acid solutions, in quantities of about 0.1 to 0.5 m$^3$ of wash liquid per m$^3$ of filtrate, and the wash liquid is subsequently squeezed off from the filter cake.

By virtue of the process according to the invention, which in contrast to conventional processes does not separate the solids in several stages by means of a settling process, followed by two filtrations of that part of the digestion suspension containing the solids in enriched form, it is surprisingly possible to filter the solid-containing digestion solution, despite its finely divided and colloidal state, in a single-stage process carried out under pressure. Pressures of 1 to 16 bars, preferably about 4 to 10 bars, are applied. In addition, the solid content of the filter cake may readily be adjusted to levels of about 50 to 70% by weight by this single-stage filtration process. In this single-stage filtration process, the solid content of the filtrate can be reduced to about 15 to 50 mg/l, so that the filtrate is present in a form suitable for hydrolysis into titanium dioxide hydrate. A membrane filter of the type illustrated, for example, on page 225 and described on pages 223 and 227 of D. B. Purchas' book "Industrial Filtration of Liquids" Second Edition, Leonard Hill Books is particularly suitable for carrying out the process according to the invention. A filtration arrangement of this kind comprises horizontal filter compartments in which filter cakes ranging from about 10 mm to 35 mm in height may be formed. Filtration may be carried out under pressures of about 1 to 16 bars, although it is preferably carried out under a pressure of about 4 to 10 bars. Filter cakes with layer thicknesses of about 15 to 25 mm are preferably formed.

Filter cloth materials suitable for filtration are, for example, polyamide, polyester and polypropylene. Filter cloth materials with a permeability D (liters of air/dm$^2$/min at a $\Delta p$ of 20 mm water column) of about 560 to 420 are particularly suitable.

In one preferred embodiment of the process according to the invention, filtration is combined with one or more washing stages in which the filter cake is treated on the filter itself. The filter cake may be washed out under pressures of about 1 to 16 bars, and preferably under pressures of about 4 to 12 bars. Washing of the homogeneous, substantially crack-free solid-containing filter cake may be carried out by passing the wash liquids, preferably water, through the filter cake or filter at flow rate of about 0.1 to 1.2 m/h and preferably at flow rate of about 0.2 to 0.6 m/h.

Before filtration, filter aids, for example finely divided aluminosilicates, are added to the solid-containing digestion solution to be filtered in quantities of about 2 to 10 g/l and preferably in quantities of about 4 to 8 g/l.

Before filtration, the filter surface is coated with an approximately 1 to 3 mm thick layer of filter aids. For this pretreatment, the filter is initially treated at pressures of about 3 to 6 bars with a suspension consisting of clear filtrate and about 5 to 10 g/l of filter aids.

Thereafter the solid-containing digestion solution, to which filter aids are added in quantities of about 2 to 10 g/l, is filtered under a pressure of about 4 to 10 bars. The temperature of the digestion solution should be adjusted at about 60° to 90° C and preferably at about 75° and 85° C. After filtration the wash liquid, preferably water, is forced through the filter cake in quantities of about 0.1 to 0.5 m$^3$ and preferably in quantities of about 0.2 to 0.4 m$^3$ of H$_2$O per m$^3$ of filtrate.

The filter cake is then pressed dry under a pressure of about 10 to 16 bars and subsequently discharged. The filtrate obtained in this way is immediately clear. The filter cake layer is preferably adjusted to a thickness of about 10 to 20 mm.

The filtration capacity of the process according to the invention amounts to about 0.15 and 0.60 m$^3$/m$^2$/h.

The yield of titanyl sulfate may be increased by 1.5 to 4.5% by the process according to the invention. In addition, the process according to the invention saves time to a considerable extent, which is important above all else, and eliminates the need to add flocculation aids.

The process according to the invention is illustrated in the following Example:

EXAMPLE

Precoat: a clear filtrate, containing 6.5 g/l of filter aid in the form of finely divided aluminosilicates, was passed through the filter for 1 minute under a pressure of 5 bars. A total of 100 l of the clear filtrate containing filter aid was used, corresponding to the filter-compartment volume of the filter.

Filtration: a black solution, containing 35 g/l of solids and 5 g/l of filter aid, was passed through the filter under a pressure of 8 bars at an average flow rate of $1.89 \cdot 10^{-2}$ m/minute, resulting in the accumulation of 450 l of filtrate. This operation lasted 9.5 minutes. The pressure was subsequently increased to 10 bars for 3 minutes. The filter cake obtained, which was 15 mm thick, was treated with 100 liters of wash water for 4.85 minutes under a pressure of 4.5 bars at a flow rate of $8.6 \cdot 10^{-3}$ m/minute. The pressure was then increased for 1 minute to 15 bars in order to remove the wash water as far as possible and to obtain a filter cake with a solid content of approximately 59% by weight. The total dead time of the filtration system caused by the filter and its accessories, during the operation described above amounted to only 5.5 minutes.

It will be appreciated that the instant specification and examples are set forth by way of illustration and not limitation, and that various modifications and changes may be made without departing from the spirit and scope of the present invention.

What is claimed is:

1. In the production of a solid-free solution of titanyl sulfate by digesting ilmenite or titanium slag with sulfuric acid, removing the non-digested particles from the solid-containing solution and filtering the solid-containing solution of titanyl sulfate to separate the solids, the improvement which comprises applying a filter aid to a membrane filter to form a coating thereon, adding a filter aid to the solid-containing solution of titanyl sulfate, filtering the solution in same membrane filter at a temperature of about 60 to 90° C and under a pressure of about 4 to 16 bars to form a filter cake of a thickness of about 10 to 35 mm, washing the filter cake with about 0.1 to 0.5 m$^3$ of wash liquid per m$^3$ of filtrate at a flow rate of about 0.1 to 1.2 m/h under a pressure of about 1 to 16 bars and squeezing the filter cake after washing to a solid content of about 50 to 70% by weight.

2. The process of claim 1, wherein the filtration is effected under a pressure of about 4 to 10 bars to produce a filter cake of about 15 to 25 mm, washing is effected with about 0.2 to 0.4 m$^3$ of wash liquid per m$^3$ of filtrate, the liquid is passed through the cake at a flow rate of about 0.2 to 0.6 m/h under a pressure of about 4 to 12 bars, and squeezing is effected under a pressure of about 10 to 16 bars to reduce the filter cake thickness to about 10 to 20 mm.

* * * * *

UNITED STATES PATENT AND TRADEMARK OFFICE
CERTIFICATE OF CORRECTION

PATENT NO. : 4,013,755
DATED : March 22, 1977
INVENTOR(S) : Raoul Weiler et al

It is certified that error appears in the above-identified patent and that said Letters Patent are hereby corrected as shown below:

Claim 1
Col. 4, line 24          cancel "same membrane..."
                         and substitute -- said membrane --

Signed and Sealed this twenty-third Day of August 1977

[SEAL]

Attest:

RUTH C. MASON
*Attesting Officer*

C. MARSHALL DANN
*Commissioner of Patents and Trademarks*